United States Patent [19]

Burleson et al.

[11] Patent Number: 5,529,127
[45] Date of Patent: Jun. 25, 1996

[54] APPARATUS AND METHOD FOR SNUBBING TUBING-CONVEYED PERFORATING GUNS IN AND OUT OF A WELL BORE

[75] Inventors: John D. Burleson, Denton; Flint R. George, Flower Mound, both of Tex.

[73] Assignee: Halliburton Company, Houston, Tex.

[21] Appl. No.: 376,334

[22] Filed: Jan. 20, 1995

[51] Int. Cl.$^6$ ............................. E21B 43/00; E21B 23/00
[52] U.S. Cl. ................................. 166/380; 166/55.1
[58] Field of Search ................................. 166/377–381, 166/55.1, 55, 297, 298

[56] References Cited

U.S. PATENT DOCUMENTS

| | | | |
|---|---|---|---|
| 3,032,109 | 5/1962 | Corley, Jr. et al. | 166/55.4 |
| 4,066,282 | 1/1978 | Vann | 285/39 |
| 4,078,611 | 3/1978 | Vann | 166/297 |
| 4,526,233 | 7/1985 | Stout | 166/377 |
| 4,756,363 | 7/1988 | Lanmon, II et al. | 166/55.1 |
| 4,762,179 | 8/1988 | Wesson et al. | 166/55.1 |
| 4,771,827 | 9/1988 | Barker et al. | 166/55.1 |
| 4,776,393 | 10/1988 | Forehand et al. | 166/55.1 |
| 5,293,940 | 3/1994 | Hromas et al. | 166/377 X |
| 5,366,014 | 11/1994 | George | 166/297 |

FOREIGN PATENT DOCUMENTS 9025166  11/1990  United Kingdom.

*Primary Examiner*—Michael Powell Buiz
*Attorney, Agent, or Firm*—William M. Imwalle; Neal R. Kennedy

[57] ABSTRACT

An apparatus and method for snubbing tubing-conveyed perforating guns in and out of a well bore. The apparatus includes a string of perforating guns wherein adjacent perforating guns are attached using a connector having an upper mandrel which is attached to a lower mandrel by left-hand threaded connection. A ratchet positioned on the upper mandrel allows left-hand rotation of the upper mandrel and ratchet with respect to the lower mandrel while preventing right-hand rotation of the ratchet with respect to the lower mandrel. Shear screws interconnecting the upper mandrel and the ratchet may be sheared upon application of a predetermined torque to allow right-hand rotation of the upper mandrel with respect to the ratchet. The lower mandrel has a recess or reduced diameter portion which is adapted for sealing engagement by a pipe ram in a blowout preventer. The connector allows snubbing of a tubing-conveyed perforating gun string in and out of a well bore under pressure while utilizing existing and unmodified workover equipment and methods of snubbing the guns into the well bore and retrieving them are disclosed.

26 Claims, 5 Drawing Sheets

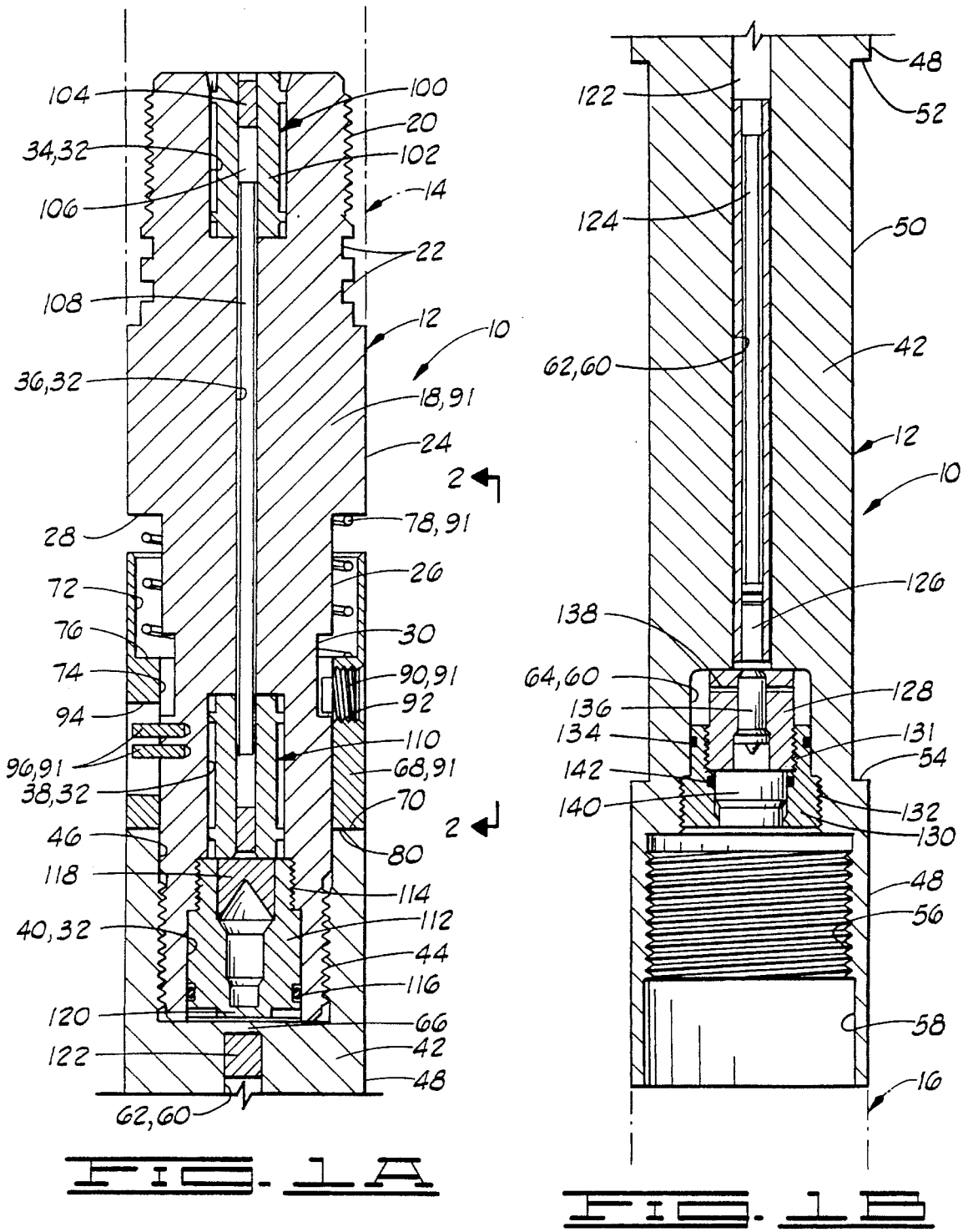

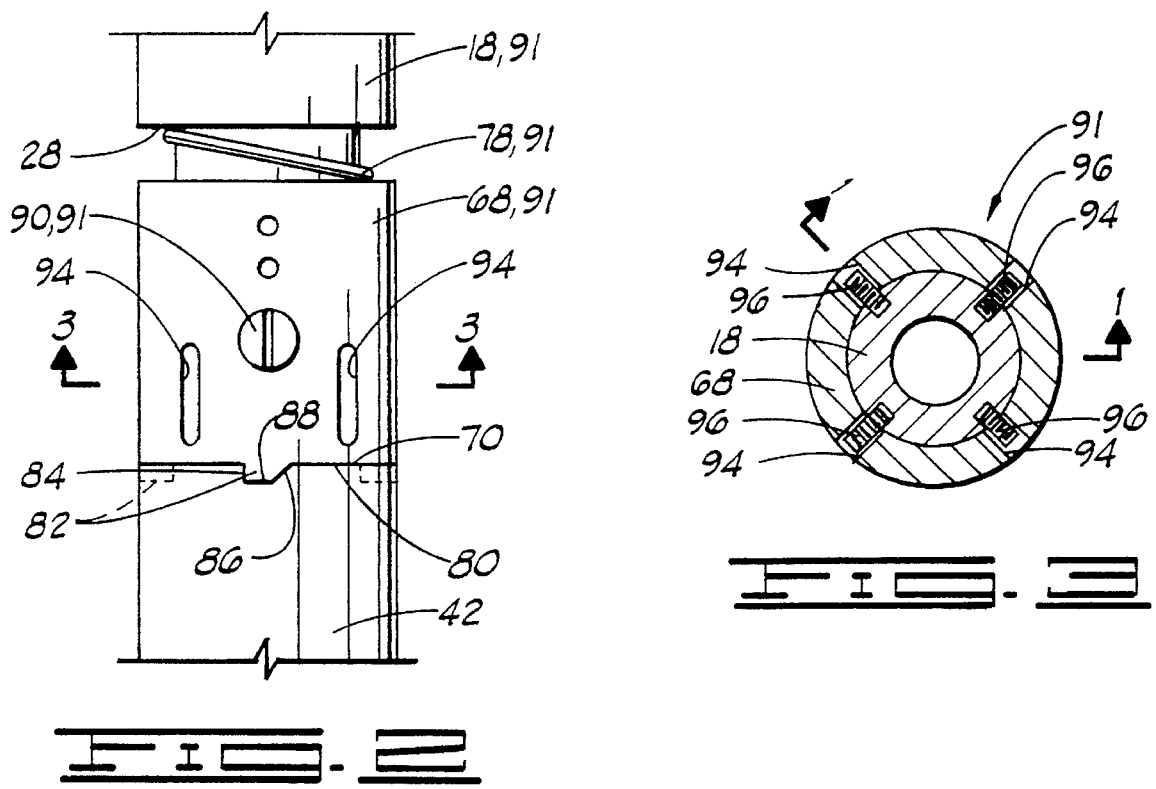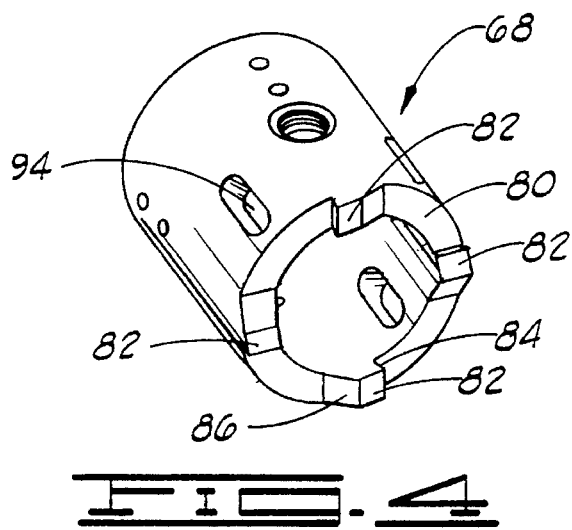

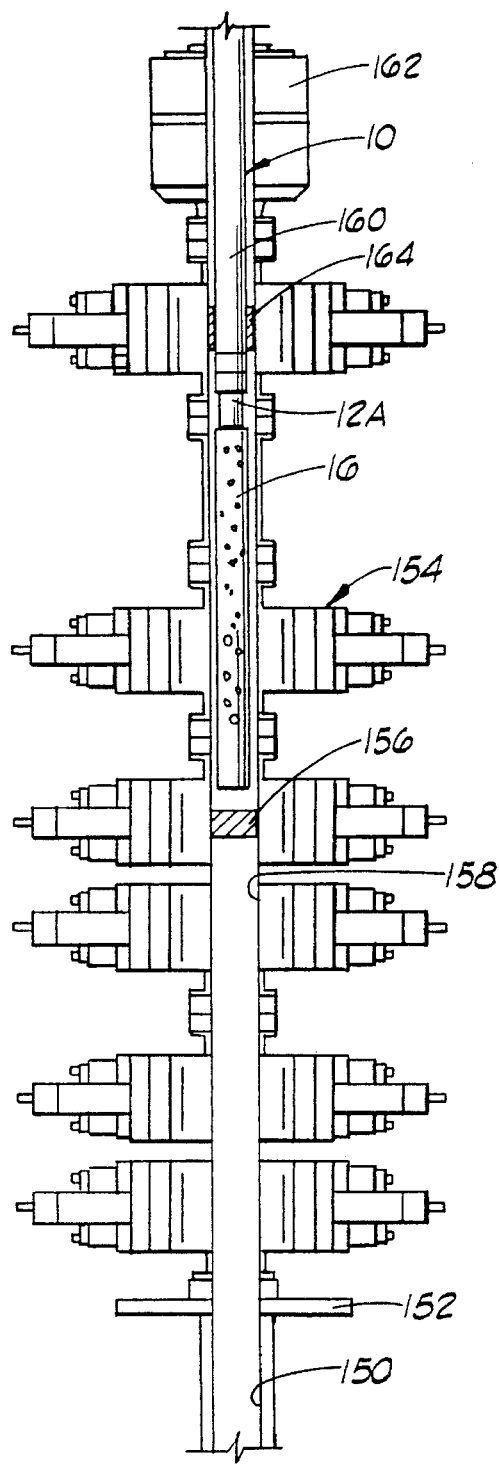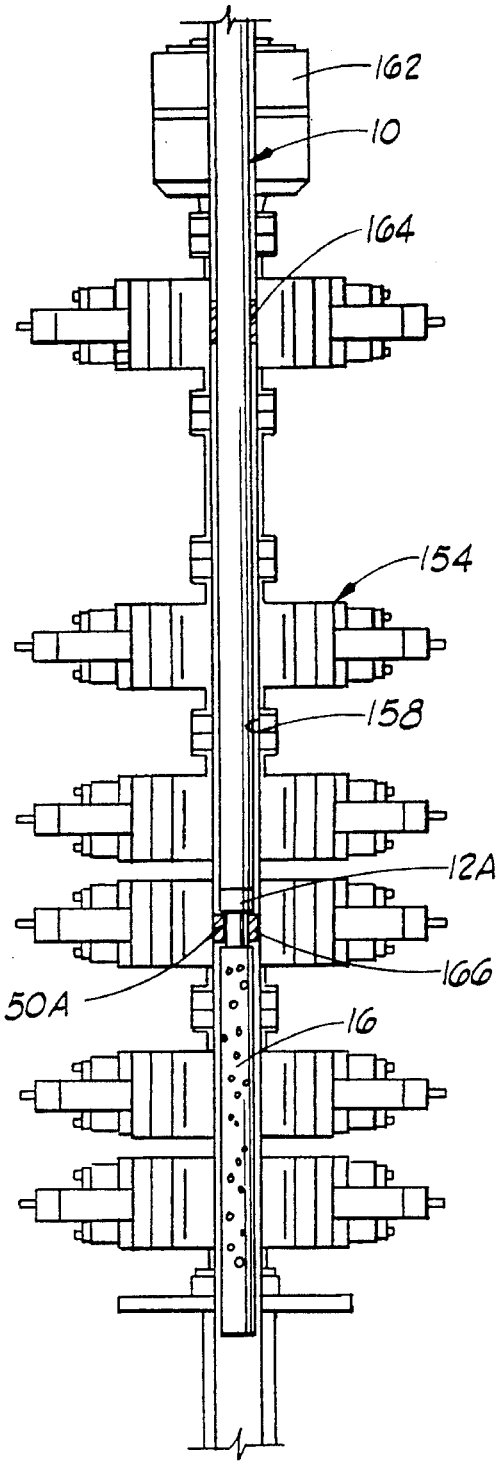

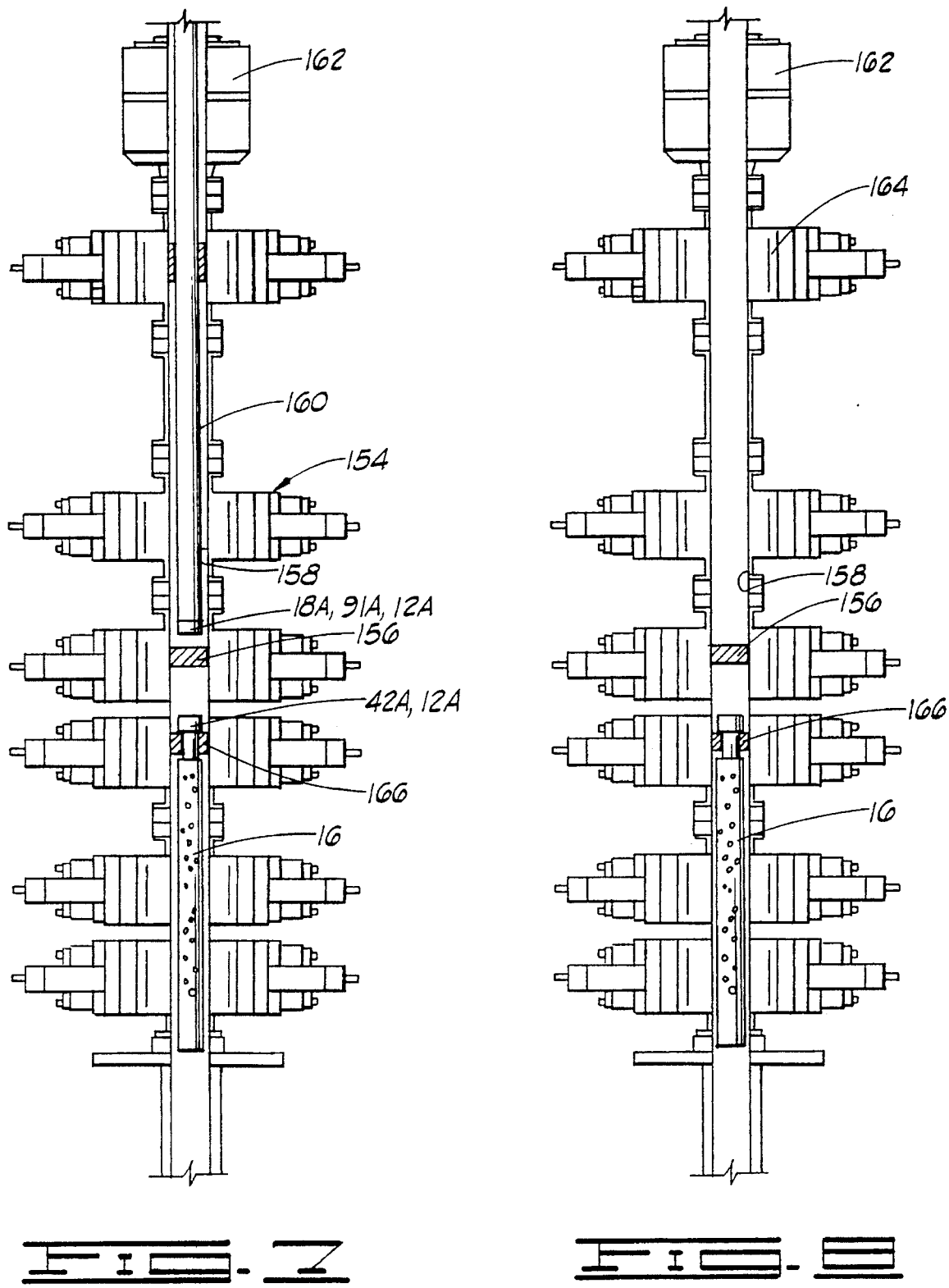

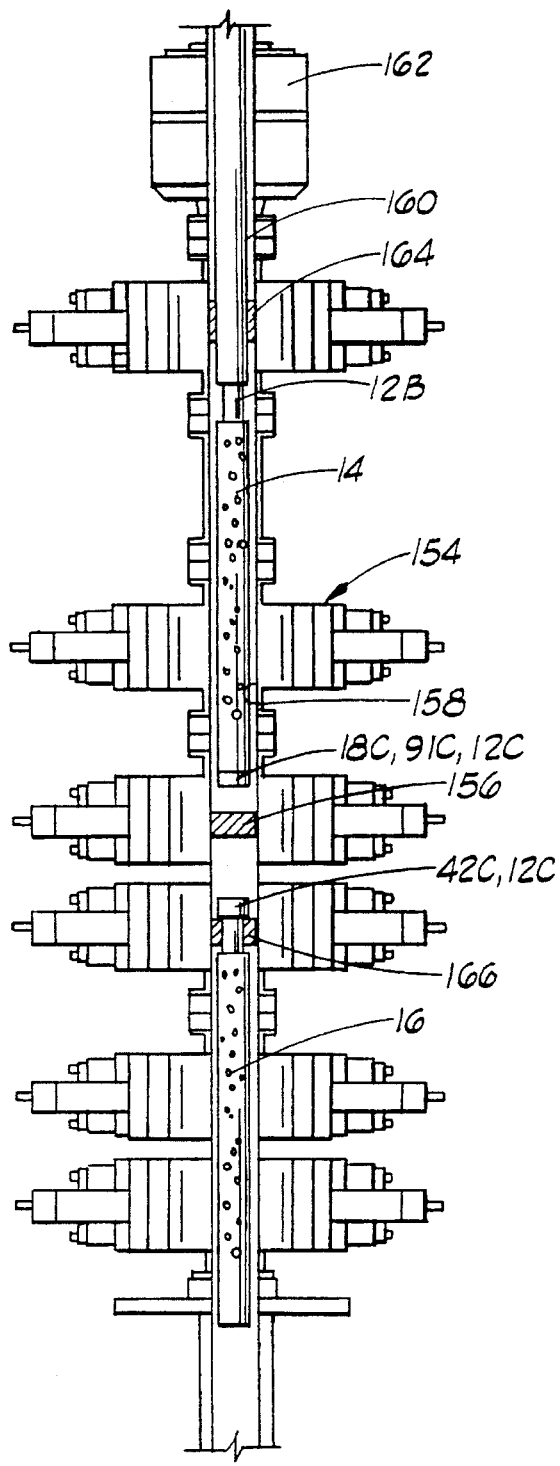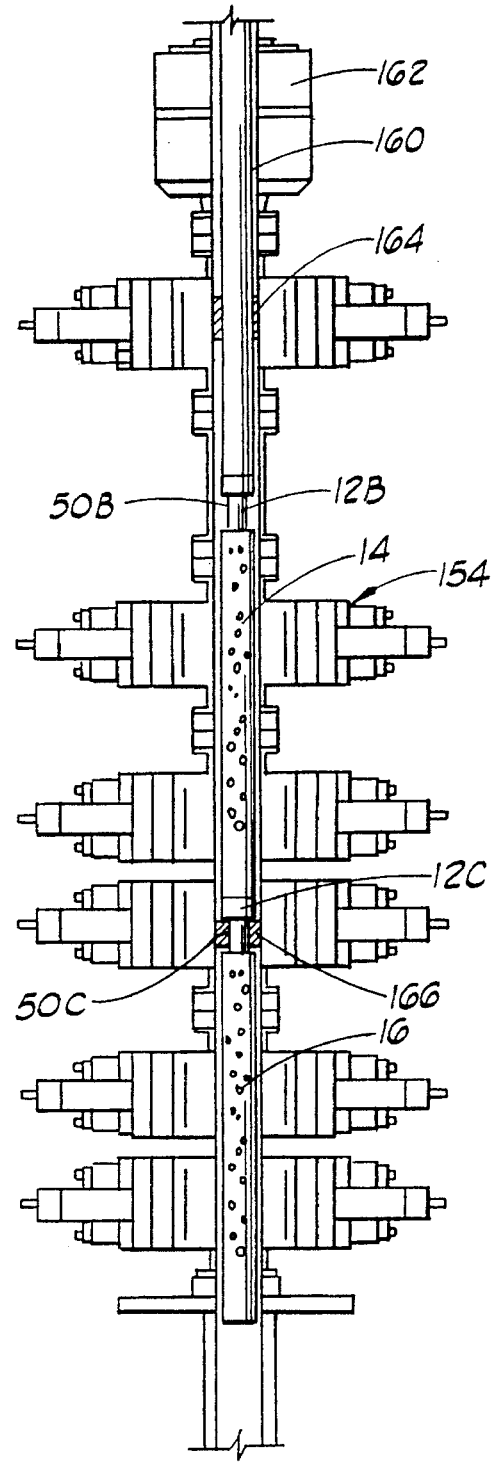
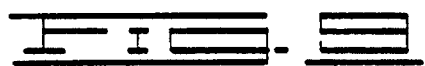 

APPARATUS AND METHOD FOR SNUBBING TUBING-CONVEYED PERFORATING GUNS IN AND OUT OF A WELL BORE

BACKGROUND OF THE INVENTION

1. Field of the Invention

This invention relates to apparatus and methods for snubbing tubing-conveyed perforating guns into and out of a well bore, and more particularly, to an apparatus and method for snubbing the guns under pressure while utilizing existing and unmodified workover equipment.

2. Description of the Prior Art

The completion of oil and gas wells by gun perforating is well known in the art. Typically, a string of perforating guns is lowered into a well casing cemented into the well bore, and the guns are positioned adjacent to the formation desired to be perforated. The perforating guns are fired to penetrate the casing and cement and form perforations in the producing formation for recovery of the desired fluids.

Tubing-conveyed perforating systems are positioned in wells on a tubing or pipe string with the string left in position in the well during the perforating of the well. After perforating of the well, the perforating guns may have disintegrated or may be retrieved, or may be released or dropped from the tubing or pipe string through the use of various techniques.

In the past, the running-in of the guns and retrieval of the guns has typically not been done under pressure. This requires that pressure be relieved in the well during these operations which takes additional time and is sometimes damaging to the well therefore undesirable. Previous devices, such as the Drexel system, have been developed to allow the guns to be lowered or retrieved under pressure. However, these prior art devices have required special workover equipment and blowout preventers. Thus, if the well does not have the special equipment, the equipment musk be installed, which again is a time-consuming task, or the procedure is simply not done at all.

Therefore, there is a need for an apparatus and method in which tubing-conveyed perforating guns may be run into a well bore and/or retrieved therefrom while the well is under pressure while utilizing existing and unmodified hydraulic workover equipment. The present invention solves this problem by providing a special connector between guns. The hydraulic workover blowout preventer pipe rams may be closed over this connector and slips set so that a string of guns may be assembled and positioned into the well bore while under pressure. The method and apparatus may also be used for retrieval by essentially reversing the process.

SUMMARY OF THE INVENTION

The present invention includes apparatus and methods for snubbing a perforating gun string into and out of a well under pressure. Existing and unmodified workover equipment may be utilized.

The apparatus includes a connector for use in connecting sections of the perforating gun string. This connector apparatus comprises upper mandrel means for connecting to an upper section of the gun string and lower mandrel means for connecting to a lower section of the gun string. The lower mandrel means is engaged with the upper mandrel means by a left-hand threaded connection, and the connector further comprises means for initially preventing disengagement of the upper mandrel means from the lower mandrel means by right-hand rotation and for allowing disengagement upon application of a predetermined right-hand torque on the upper mandrel means.

The means for initially preventing disengagement preferably comprises a ratchet connected to the upper mandrel means and adapted for allowing left-hand rotation of the mandrel means and ratchet with respect to the lower mandrel means and further adapted for preventing right-hand rotation of the ratchet with respect to the lower mandrel means. The apparatus further comprises shearing means for shearably connecting the lower ratchet to the upper mandrel means such that right-hand rotation of the upper mandrel means is allowed with respect to the ratchet upon application of the predetermined torque. Preferably, the ratchet defines a longitudinal slot therein, and the shear means is characterized by a shear screw engaged with the upper mandrel means and extending into the slot. The slot allows some longitudinal movement of the ratchet.

The connector apparatus further comprises biasing means for biasing the ratchet toward the lower mandrel means and for ratcheting engagement therewith when their ratchet profiles are aligned. The biasing means is characterized in the illustrated embodiment by a spring disposed between a shoulder on the upper mandrel means and a shoulder on the ratchet.

The connector apparatus further comprises a lug attached to the ratchet and extending into a recess defined on the upper mandrel means such that longitudinal movement of the ratchet with respect to the upper mandrel means is limited.

The apparatus additionally comprises means for providing an explosive path from an upper end of the upper mandrel means to a lower end of the lower mandrel means.

In the preferred embodiment, the lower mandrel means preferably defines a reduced diameter portion or recess thereon which is adapted for sealing engagement by a pipe ram in a blowout preventer.

The present invention includes a method of snubbing perforating guns into a well under pressure. The method comprises the steps of closing a blind ram in a blowout preventer on the well, connecting by left-hand rotation a slick joint to a perforating gun, lowering the slick joint and the perforating gun into the blowout preventer, and closing a packoff around the slick joint. The method also comprises opening the blind ram, further lowering the slick joint and gun into the blowout preventer, closing pipe rams on a connector between the slick joint and the perforating gun, disconnecting by right-hand rotation the slick joint from the perforating gun, and raising the slick joint in the blowout preventer. The method further comprises the steps of closing the blind ram below the slick joint, opening the packoff and removing the slick joint from the blowout preventer, connecting by left-hand rotation the slick joint to another gun, lowering the slick joint and the other gun into the blowout preventer, closing the packoff around the slick joint, opening the blind ram, further lowering the slick joint and the other perforating gun into the blowout preventer and connecting by left-hand rotation the other gun to the first-mentioned gun, opening the blind rams, lowering the slick joint and the perforating gun into the blowout preventer, and closing the pipe rams on a connector between the slick joint and the uppermost one of the guns. Additional guns may be positioned in the well by repeating the appropriate steps.

The step of connecting by left-hand rotation the slick joint to the perforating gun preferably comprises making a left-hand threaded connection between an upper mandrel attached to the lower end of the slick joint with a lower mandrel attached to the upper end of the gun. This comprises using a ratchet on the upper mandrel to allow left-hand rotation between the ratchet and the lower mandrel while preventing right-hand rotation between the ratchet and the lower mandrel. This may also comprise shearably attaching the ratchet to the upper mandrel such that right-hand rotation of the upper mandrel with respect to the ratchet is allowed upon application of a predetermined torque.

The invention also includes a method of retrieving perforating guns from a well under pressure, and this retrieving method comprises the steps of positioning a slick joint in a blowout preventer and closing a packoff around the slick joint, connecting by left-hand rotation the slick joint to an uppermost one of the guns, raising the slick joint and guns, closing pipe rams on a connector between the uppermost gun and a next lower gun, disconnecting by right-hand rotation the uppermost gun from the next lower gun, and raising the slick joint and the disconnected uppermost gun. This retrieving method also comprises closing a blind ram below the slick joint and the disconnected gun, opening the packoff and removing the slick joint and disconnected gun from the blowout preventer, disconnecting by right-hand rotation the slick joint from the disconnected gun, positioning the slick joint in the blowout preventer, and closing the packoff around the slick joint. The retrieving method also comprises opening the blind ram, lowering the slick joint into the blowout preventer, connecting by left-hand rotation the slick joint to the uppermost one of the remaining guns in the well, and opening the pipe rams. The appropriate steps may be repeated as desired to remove each gun sequentially.

In the retrieving method, the method of connecting by left-hand rotation comprises the same steps as in the method for snubbing the guns into the well bore.

Numerous objects and advantages of the invention will become apparent as the following detailed description of the preferred embodiment is read in conjunction with the drawings which illustrate such embodiment.

BRIEF DESCRIPTION OF THE DRAWINGS

FIGS. 1A and 1B show a special isolation sub or connector used in the apparatus of the present invention for connecting adjacent perforating guns or connecting a gun to a slick joint. The cross section of FIG. 1A is taken along lines 1—1 in FIG. 3.

FIG. 2 is a side elevational view of a portion of the connector apparatus as seen from lines 2—2 in FIG. 1A.

FIG. 3 is a cross section taken along lines 3—3 in FIG. 2.

FIG. 4 is a perspective view of a ratchet sleeve used in the connector as seen from the lower end of the ratchet sleeve.

FIGS. 5–10 show a hydraulic workover blowout preventer with the apparatus of the present invention shown sequentially during a running-in process.

DETAILED DESCRIPTION OF THE PREFERRED EMBODIMENTS

Referring now to FIGS. 1A and 1B, the apparatus of the present invention for snubbing tubing-conveyed perforating guns into and out of a well bore is shown and generally designated by the numeral 10. Apparatus 10 comprises one or more isolation subs or connectors 12 used to interconnect adjacent pairs of perforating guns 14 and 16. Perforating guns 14 and 16 may actually be perforating gun strings, each made up of a plurality of individual gun units.

Perforating guns 14 and 16 are generally of a kind known in the art and will be referred to as upper perforating gun 14 and lower perforating gun 16 herein. This positional identification of guns 14 and 16 is relative to connector 12 and does not necessarily mean that gun 14 is the uppermost gun and that gun 16 is the lowermost gun. Those skilled in the art will understand that any number of guns or strings of guns may be connected together with a connector 12 disposed between each pair of adjacent guns or gun strings.

As will be further discussed herein, connector 12 may also be used to connect a perforating gun to another portion of the tubing string, such as a lifting sub or slick joint. That is, connector 12 is not limited solely to use between adjacent guns.

Connector 12 comprises an upper mandrel 18 having an externally threaded surface 20 at its upper end which is adapted for engagement with upper gun 14. Grooves 22 are defined in connector 12 below external threaded surface 20, and these grooves are used for a known sealing means, such as a plurality of O-rings (not shown), for providing sealing engagement between upper mandrel 18 and upper gun 14.

Upper mandrel 18 has a first outside diameter 24 and a smaller second outside diameter 26. A downwardly facing shoulder 28 extends between first outside diameter 24 and second outside diameter 26. An annular groove 30 is defined in second outside diameter 26 below shoulder 28.

Upper mandrel 18 further defines a central opening 32 which includes a first bore 34, a smaller second bore 36, a third bore 38 which is substantially the same size as first bore 34, and a fourth bore 40 at the lower end.

The lower end of upper mandrel 18 is attached to a lower mandrel 42 by left-hand threaded connection 44. Second outside diameter of upper mandrel 18 extends partially into an upper bore 46 of lower mandrel 42.

Referring also to FIG. 1B, lower mandrel 42 has a first outside diameter 48 and a smaller second outside diameter 50. Thus, second outside diameter 50 may be referred to as a recess 50 in first outside diameter 48 with facing shoulders 52 and 54 on opposite ends of the recess.

Second outside diameter 50 is machined to a relatively smooth finish so that it can be sealingly engaged with a pipe ram seal in a hydraulic workover blowout preventer as will be further described herein.

At the lower end of lower mandrel 42 is an internal threaded surface 56 adapted for engagement with lower gun 16 in a manner known in the art. Below internal threaded surface 56 is a lower bore 58 adapted for engagement by a known sealing means, such as a plurality of O-rings (not shown), carried by lower gun 16, again in a manner known in the art.

A central cavity 60 is defined in lower mandrel 42, and this central cavity opens downwardly toward internal threaded surface 56 and lower bore 58. In other words, central cavity 50 is in communication with lower gun 16. Central cavity 60 includes a first bore 62 and a larger second bore 64.

Central cavity 60 in lower mandrel 42 is separated from upper bore 46 and left-hand threaded connection 44 by a wall portion 66. It will be seen by those skilled in the art that wall portion 66 thus separates central cavity 60 in lower mandrel 42 from central opening 32 in upper mandrel 18.

Referring now to FIGS. 1A, 2, 3 and 4, a generally annular ratchet sleeve 68 is disposed around second outside diameter 26 of upper mandrel 18 and is located longitudinally between upper end 70 of lower mandrel 42 and shoulder 28 on upper mandrel 18.

Ratchet sleeve 68 has a first bore 72 and a smaller second bore 74 defined therein. An upwardly facing shoulder 76 extends between first bore 72 and second bore 74.

A biasing means, such as spring 78, is disposed between shoulder 28 on upper mandrel 18 and shoulder 76 in ratchet sleeve 68 for biasing the ratchet mandrel downwardly toward lower mandrel 42.

As seen in FIGS. 2 and 4, lower end 80 of ratchet sleeve 68 has a ratchet profile comprising a plurality of ratchet teeth 82 extending downwardly therefrom. Each ratchet tooth 82 has a substantially vertical left side 84 and a slanted right side 86. Referring to FIG. 2, ratchet teeth 82 are adapted to fit in a corresponding ratchet profile comprising a plurality of ratchet grooves 88 defined in upper end 70 of lower mandrel 42. Because of this ratchet engagement between ratchet sleeve 68 and lower mandrel 42, the lower mandrel may also be referred to as a ratchet mandrel 42. The operation and function of this ratchet engagement will be further described herein, but basically it allows left-hand rotation of ratchet sleeve 68 with respect to lower mandrel 42 while preventing right-hand rotation of the ratchet sleeve with respect to the lower mandrel.

Ratchet teeth 82 may also be more clearly understood by reference to the prospective of ratchet sleeve 68 shown in FIG. 4. FIG. 4 is viewed from lower end 80 of ratchet sleeve 68.

Referring again to FIGS. 1 and 2, a ratchet sleeve lug 90 is attached to ratchet sleeve 68 by threaded connection 92. Ratchet sleeve lug 90 extends radially inwardly from second bore 74 in ratchet sleeve 68 and into groove 30 in upper mandrel 18. Ratchet sleeve lug 90 thus serves to hold ratchet sleeve 68, and thus spring 78, in relationship to upper mandrel 18. That is, once ratchet sleeve lug 90 is in place, the lug, ratchet sleeve 68, spring 78 and upper mandrel 18 form an upper mandrel assembly 91.

Ratchet sleeve 68 defines a plurality of longitudinally extending slots 94 therein. Slots 94 are preferably angularly spaced about a vertical axis of connector 12, as best seen in FIG. 3.

At least one shear screw 96 is threadingly engaged with upper mandrel 18 below groove 30. Shear screw 96 extends radially outwardly into a corresponding adjacent slot 94 in ratchet sleeve 68. Thus, shear screw 96 is also part of upper mandrel assembly 91. In the embodiment shown in the drawings, a pair of such shear screws 96 extends into each of four slots 94. However, the invention is not intended to be limited to this particular number of shear screws 96 and slots 94. The actual number of screws and slots may be varied as necessary to provide the desired shear force necessary to rotate upper mandrel 18 with respect to ratchet sleeve 68. This shearing action and the variation thereof will be described further herein.

Referring again to FIGS. 1A and 1B, the components used to provide an explosive transfer from upper gun 14 to lower gun 16 through connector 12 will now be described.

A first explosive device 100 is disposed in first bore 34 of upper mandrel 18. First explosive device 100 comprises an insert 102 with a booster 104 disposed therein. Booster 104 has a metallic portion 106 which is crimped around one end of a length of detonation cord 108, also referred to as DET cord 108. DET cord 108 extends through second bore 36 of upper mandrel 18.

A substantially identical second explosive device 110 is disposed in third bore 38 of upper mandrel 18. Second explosive device 110 also has a booster which is connected to the lower end of DET cord 108 in the manner previously described.

A charge housing 112 is connected to upper mandrel 18 at threaded connection 114. A sealing means, such as O-ring 116, provides sealing engagement between charge housing 112 and fourth bore 40 of upper mandrel 18. A shaped charge 118 is disposed in the upper end of charge housing 112 and is adapted to provide an explosive force directed downwardly toward the closed lower end of charge housing 112. Closed lower end 120 of charge housing 112 and wall portion 66 of lower mandrel 42 provide a steel seal barrier between central opening 32 of upper mandrel 18 and central cavity 60 of lower mandrel 42.

A DET cord initiator 122 is disposed in the upper end of first bore 62 in lower mandrel 42 adjacent to wall portion 66. DET cord initiator 122 is connected to another length of DET cord 124 which extends through first bore 62 of lower mandrel 42. At the lower end of DET cord 124 is a DET cord end seal 126.

A firing pin housing 128 is disposed in second bore 64 of lower mandrel 42. Firing pin housing 128 is connected to an initiator housing 130 at threaded connection 131. Initiator housing 130 is attached to lower mandrel 42 at threaded connection 132. A sealing means, such as O-ring 134, provides sealing engagement between initiator housing 130 and second bore 64 of lower mandrel 42.

A firing pin 136 is disposed in firing pin housing 128 and initially held in place by a shear pin 138.

Firing pin 136 is directed downwardly toward an initiator 140 which is clamped against firing pin housing 128 by initiator housing 130. A sealing means, such as O-ring 142 provides sealing engagement between initiator housing 130 and initiator 140.

Operation Of The Invention

Referring now to FIGS. 5–10, the operation of apparatus 10 and a method of snubbing tubing-conveyed perforating guns into and out of a well bore under pressure will be described. This operation and method will be described with respect to snubbing into and out of a well bore 150 having a well head 152 with a hydraulic workover blowout preventer 154 connected thereto. Blowout preventer 154 is of a kind known in the art and is not a specialized device built solely for use with apparatus 10.

Looking first at FIG. 5, the first step is to close blind rams 156 on blowout preventer 154. This closes off central opening 158 in the blowout preventer.

Perforating gun 16 is attached to a lifting sub/slick joint 160 by a connector 12, identified as connector 12A. In making up the tool, lower mandrel 42 of connector 12A is attached to perforating gun 16. Upper mandrel assembly 91 of connector 12A is connected to the lower end of slick joint 160. These connections are as previously described. Upper mandrel 18 is then engaged by left-hand rotation with lower mandrel 42 to form left-hand threaded connection 44 (see FIG. 1A). By referring again to FIG. 2, it will be seen that ratchet sleeve 68 allows such left-hand rotation of the ratchet sleeve with respect to lower mandrel 42 because of slanted side 86 of ratchet sleeve lugs 82. Right-hand rotation of ratchet sleeve 68 with respect to lower mandrel 42 is prevented because of vertical side 84 of ratchet teeth 82. Thus, it will be seen by those skilled in the art that right-hand rotation of upper mandrel 18 with respect to lower mandrel 42 is not possible without first shearing shear screws 96 which will disengage the ratchet mechanism. Therefore, it is important to select the number of shear screws 96 to provide the appropriate shear force necessary for right-hand rotation when desired without prematurely shearing the shear screws.

Referring still to FIG. 5, gun 16 and slick joint 160, connected by connector 12A, are lowered through hydraulic workover lubricator 162 into central opening 158 of blowout preventer 154.

A packoff is formed around slick joint 160 by engaging seals 164 in blowout preventer 154. At this point, blind rams 156 may be opened. Now referring to FIG. 6, apparatus 10 is lowered into blowout preventer 154 until recess 50A of connector 12A is aligned with pipe rams and slips 166 of blowout preventer 154. The pipe rams are closed onto second outside diameter 50A and the slips are set.

Lifting sub/slick joint 160 is then disconnected from perforating gun 16 by turning to the right and thus applying a predetermined torque for shearing shear screws 96 in connector 12A. Because of the left-hand threaded connection 44 in connector 12A, upper mandrel assembly 91A is thus threadingly disengaged from lower mandrel 42A.

Slick joint 160 may then be raised upwardly so that upper mandrel assembly 91A of connector 12A is above blind rams 156. Lower mandrel 42A remains with perforating gun 16 and sealed off by pipe rams and slips 166. Blind rams 156 may again be closed, as seen in FIG. 7. At this point, seals 164 may be disengaged from slick joint 160 and the slick joint removed from blowout preventer 154. See FIG. 8.

Referring now to FIG. 9, another perforating gun 14 is attached to the lower end of slick joint 160 by another connector 12, identified as connector 12B. At the lower end of perforating gun 14 is another upper mandrel assembly 91. This upper mandrel assembly 91 is identified as upper mandrel assembly 91C which, as will be described later, forms part of a connector 12C. Correspondingly, lower mandrel 42 attached to perforating gun 16 is identified in FIG. 9 as lower mandrel 42C. Those skilled in the art will recognize that lower mandrel 42C is actually the same lower mandrel 42A previously discussed.

The assembly of slick joint 160, connector 12B, perforating gun 14 and upper mandrel assembly 91C is lowered through lubricator 162 into blowout preventer 154, and a packoff is formed around the slick joint by engaging seal 164, in the same manner as previously described. Blind rams 156 may be opened, and the apparatus lowered until upper mandrel assembly 91C can be engaged with lower mandrel 42C by left-hand rotation to form a complete connector 12C. See FIG. 10.

Pipe rams and slips 166 may then be disengaged from recess 50C of connector 12C and the entire assembly comprising slick joint 160, connector 12B, perforating gun 14, connector 12C and perforating gun 16 lowered until connector 12B is aligned with pipe rams and slips 166. The pipe rams may then be closed and the slips set on recess 50B of connector 12B, in the manner previously described. Slick joint 160 may be disengaged by right-hand rotation by shearing shear screws 96 in connector 12B, as before, so that additional perforating guns may be made up in the string as desired.

Once the complete assembly of all the guns is in the well bore, the apparatus may be run down into well bore 150 in a manner known in the art and the guns fired according to the procedure desired for the well. Each connector 12 provides an explosive transfer from adjacent upper gun 14 and lower gun 16. When upper gun 14 is fired in a manner known in the art, this explosive force actuates first explosive device 100 which is transmitted through DET cord 108 to second explosive device 110. Second explosive device 110 ignites shaped charge 118 which directs an explosive downward force against closed lower end 120 of charge housing 112 and wall portion 66 of lower mandrel 42 which destroys closed lower end 120 and wall portion 66. The explosive force is thus transferred to DET cord initiator 122, through DET cord 124 to provide a downwardly acting explosive force on firing pin 136. This force is sufficient to shear shear pin 138 so that firing pin 136 moves rapidly downwardly to impact initiator 140. The force is thus transferred downwardly into the upper end of lower gun 16, starting the known firing sequence within gun 16 itself. Thus, when the uppermost gun of apparatus 10 is fired, the guns will be fired sequentially downwardly.

To retrieve the apparatus after firing of the guns, the string of guns is pulled back to the surface until connector 12C is again aligned with pipe rams and slips 166 which may be set in the normal manner. At this point, application of a predetermined torque by right-hand rotation will cause shear screws 96 in connector 12C to be sheared, thereby separating perforating guns 14 and 16. Connector 12B preferably has more shear pins 96 than connector 12C so that connector 12C shears first.

The perforating guns may then be removed under pressure one at a time from well bore 150 through blowout preventer 154 by essentially reversing the installation procedure previously described.

Although not shown, it is noted that an isolation sub of a kind known in the art is located in each section of the perforating guns where pipe rams and slips 166 in blowout preventer 154 will be set. These prior art isolation subs maintain an internal seal and prevent fluid flow through the guns before and after firing.

It will be seen therefore, that the apparatus and method for snubbing tubing-conveyed perforating guns into and out of a well bore of the present invention are well adapted to carry out the ends and advantages mentioned as well as those inherent therein. While a presently preferred embodiment has been described for the purposes of this disclosure, numerous changes in the arrangement and construction of parts in the apparatus and steps in the method may be made by those skilled in the art. All such changes are encompassed within the scope and spirit of the appended claims.

What is claimed is:

1. An apparatus for use in connecting sections of a perforating gun string, said apparatus comprising:

upper mandrel means for connecting to an upper section of the gun string;

lower mandrel means, engaged with said upper mandrel means by a left-hand threaded connection, for connecting to a lower section of the gun string; and means for initially preventing disengagement of said upper mandrel means from said lower mandrel means by right-hand rotation and for allowing disengagement upon application of a predetermined torque on said upper mandrel means.

2. The apparatus of claim 1 wherein said means for initially preventing disengagement comprises a ratchet connected to said upper mandrel means and adapted for allowing left-hand rotation of said mandrel means and ratchet with respect to said lower mandrel means and further adapted for preventing right-hand rotation of said ratchet with respect to said lower mandrel means.

3. The apparatus of claim 2 further comprising shearing means for shearably connecting said ratchet to said upper mandrel means such that right-hand rotation of said upper mandrel means is allowed with respect to said ratchet upon application of said predetermined torque.

4. The apparatus of claim 3 wherein:
said ratchet defines a slot therein; and
said shear means is characterized by a shear screw engaged with said upper mandrel means and extending into said slot.

5. The apparatus of claim 2 further comprising biasing means for biasing said ratchet toward said lower mandrel means.

6. The apparatus of claim 5 wherein said biasing means is characterized by a spring disposed between a shoulder on said upper mandrel means and a shoulder on said ratchet.

7. The apparatus of claim 2 further comprising a lug attached to said ratchet and extending into a recess defined on said upper mandrel means such that longitudinal movement of said ratchet with respect to said upper mandrel means is limited.

8. The apparatus of claim 1 further comprising means for providing an explosive path from an upper end of said upper mandrel means to a lower end of said lower mandrel means.

9. The apparatus of claim 1 wherein said lower mandrel means defines a recess on an outer surface thereof.

10. An apparatus for connecting a pair of perforating guns, said apparatus comprising:
an upper mandrel adapted for connection to an upper one of the guns;
a lower mandrel adapted for connection to a lower one of the guns and further adapted for left-hand threaded engagement with said upper mandrel, said lower mandrel comprising a ratchet profile on an end thereof;
a ratchet disposed around said upper mandrel, said ratchet having a ratchet profile thereon adapted for engagement with said ratchet profile on said lower mandrel for allowing left-hand rotation of said ratchet with respect to said lower mandrel and preventing right-hand rotation of said ratchet with respect to said mandrel; and
shear means for shearably connecting said ratchet to said upper mandrel and allowing right-hand rotation of said upper mandrel with respect to said ratchet upon application of a predetermined torque.

11. The apparatus of claim 10 further comprising biasing means for biasing said ratchet toward said lower mandrel such that said ratchet profiles are normally engaged.

12. The apparatus of claim 11 wherein said biasing means is characterized by a spring disposed between a shoulder on said upper mandrel and a shoulder on said ratchet.

13. The apparatus of claim 10 wherein said shear means comprises a shear screw attached to said upper mandrel and extending into a slot defined in said ratchet.

14. The apparatus of claim 13 wherein said slot defined in said ratchet is longitudinally disposed such that longitudinal movement of said ratchet is allowed with respect to said upper mandrel.

15. The apparatus of claim 10 wherein said upper mandrel defines a groove therein; and
further comprising a lug engaged with said ratchet and extending into said groove such that longitudinal movement of said ratchet with respect to said upper mandrel is limited.

16. The apparatus of claim 10 wherein an outer surface of said lower mandrel defines a reduced diameter portion.

17. A method of snubbing perforating guns into a well under pressure, said method comprising the steps of:
(a) closing a blind ram in a blowout preventer on said well;
(b) connecting by left-hand rotation a slick joint to a perforating gun;
(c) lowering said slick joint and said perforating gun into said blowout preventer;
(d) closing a packoff around said slick joint;
(e) opening said blind ram;
(f) further lowering said slick joint and gun into said blowout preventer;
(g) closing pipe rams on a connector between said slick joint and said perforating gun;
(h) disconnecting by right-hand rotation said slick joint from said perforating gun;
(i) raising said slick joint in said blowout preventer;
(j) closing said blind ram below said slick joint;
(k) opening said packoff and removing said slick from said blowout preventer;
(l) connecting by left-hand rotation said slick joint to another gun;
(m) lowering said slick joint and the other gun into said blowout preventer;
(n) closing said packoff around said slick joint;
(o) opening said blind ram;
(p) further lowering said slick joint and said other perforating gun into said blowout preventer and connecting by left-hand rotation said other gun to the first-mentioned gun;
(q) opening said pipe rams;
(r) lowering said slick joint and said perforating guns into said blowout preventer;
(s) closing said pipe rams on a connector between said slick joint and an uppermost one of said guns; and
(t) repeating steps (h)–(s) as desired.

18. The method of claim 17 wherein step (b) comprises making a left-hand threaded connection between an upper mandrel attached to a lower end of said slick joint with a lower mandrel attached to an upper end of said gun.

19. The method of claim 18 wherein step (b) further comprises using a ratchet on said upper mandrel to allow left-hand rotation between said ratchet and said lower mandrel while preventing right-hand rotation between said ratchet and said lower mandrel.

20. The method of claim 19 wherein step (b) further comprises shearably attaching said ratchet to said upper mandrel such that right-hand rotation of said upper mandrel with respect to said ratchet is allowed upon application of a predetermined torque.

21. The method of claim 20 wherein step (b) further comprises shearing a shear screw upon application of said predetermined torque.

22. A method of retrieving perforating guns from a well under pressure, said method comprising the steps of:
(a) positioning a slick joint in a blowout preventer and closing a packoff around said slick joint;
(b) connecting by left-hand rotation said slick joint to an uppermost one of said guns;
(c) raising said slick joint and guns;
(d) closing pipe rams on a connector between said uppermost gun and a next lower gun;
(e) disconnecting by right-hand rotation said uppermost gun from said next lower gun;
(f) raising said slick joint and the disconnected uppermost gun;
(g) closing a blind ram below said slick joint and said disconnected gun;
(h) opening said packoff and removing said slick joint and disconnected gun from said blowout preventer;

(i) disconnecting by right-hand rotation said slick joint from said disconnected gun;

(j) positioning said slick joint in said blowout preventer;

(k) closing said packoff around said slick joint;

(l) opening said blind ram;

(m) lowering said slick joint into said blowout preventer;

(n) connecting by left-hand rotation said slick joint to the uppermost one of said guns remaining in said well;

(o) opening said pipe rams; and (p) repeating steps (c)–(o) as desired.

23. The method of claim 22 wherein step (b) comprises making a left-hand threaded connection between an upper mandrel attached to a lower end of said slick joint with a lower mandrel attached to said uppermost one of said guns.

24. The method of claim 23 wherein step (b) further comprises using a ratchet on said upper mandrel to allow left-hand rotation between said ratchet and said lower mandrel while preventing right-hand rotation between said ratchet and lower mandrel.

25. The method of claim 24 wherein step (b) further comprises shearably attaching said ratchet to said upper mandrel such that right-hand rotation of said upper mandrel with respect to said ratchet is allowed upon application of a predetermined torque.

26. The method of claim 25 wherein step (b) further comprises shearing a shear screw upon application of said predetermined torque.

* * * * *